United States Patent
McNabb et al.

[11] Patent Number: 6,015,445
[45] Date of Patent: *Jan. 18, 2000

[54] ANTI-CAKING SOLIDS

[75] Inventors: Andrew J. McNabb; R. Merritt Sink, both of Lake Jackson, Tex.

[73] Assignee: BASF Corporation, Mt. Olive, N.J.

[ * ] Notice: This patent is subject to a terminal disclaimer.

[21] Appl. No.: 08/837,198

[22] Filed: Apr. 14, 1997

[51] Int. Cl.[7] .............................. C05C 9/00; C05C 7/00; C05B 15/00; C05B 7/00

[52] U.S. Cl. .......................... 71/28; 71/29; 71/30; 71/34; 71/35; 71/58; 71/60; 71/64.07; 71/64.12; 427/212; 427/220; 428/403

[58] Field of Search .............................. 71/64.07, 64.12, 71/34, 36, 60, 28, 29, 30, 35, 58; 427/212, 220; 428/403, 524

[56] References Cited

U.S. PATENT DOCUMENTS

| | | | |
|---|---|---|---|
| 1,266,212 | 5/1918 | Capron | 23/119 |
| 1,919,707 | 7/1933 | Adam et al. | |
| 2,043,067 | 6/1936 | Rumscheidt et al. | 23/119 |
| 2,092,073 | 9/1937 | Jeltsch et al. | 23/119 |
| 2,099,079 | 11/1937 | Rumscheidt et al. | 23/119 |
| 2,102,107 | 12/1937 | Berkhoff, Jr. | 23/119 |
| 2,178,082 | 10/1939 | Rayner | 23/119 |
| 2,226,101 | 12/1940 | Ogden | 23/119 |
| 2,228,742 | 1/1941 | Applebey | 23/119 |
| 2,368,901 | 2/1945 | Tiddy | 23/119 |
| 2,423,794 | 7/1947 | Otto | 23/119 |
| 2,424,207 | 7/1947 | Otto | 23/119 |
| 2,599,067 | 6/1952 | Otto | 23/119 |
| 2,631,084 | 3/1953 | Robinson | 23/119 |
| 2,659,659 | 11/1953 | Schmidl | 23/119 |
| 2,782,097 | 2/1957 | Costolow | 23/119 |

(List continued on next page.)

FOREIGN PATENT DOCUMENTS

| | | |
|---|---|---|
| 980596 | 12/1975 | Canada . |
| 179538 | 7/1979 | Czechoslovakia . |
| 0255665 | 2/1988 | European Pat. Off. . |
| 0320987 | 6/1989 | European Pat. Off. . |
| 1578057 | 7/1969 | France . |
| 10 01 693 | 1/1957 | Germany . |
| 100735 | 10/1973 | Germany . |
| 218089 | 1/1985 | Germany . |
| 61-256917 | 11/1986 | Japan . |
| 62-46920 | 2/1987 | Japan . |
| 2019535 | 9/1994 | Russian Federation . |
| 919994 | 4/1982 | U.S.S.R. . |
| 1169966 | 7/1985 | U.S.S.R. . |
| 4909243 | 9/1994 | U.S.S.R. ............... 71/64.12 |
| 1 067 635 | 5/1967 | United Kingdom . |
| 1381480 | 1/1975 | United Kingdom . |
| 9118059 | 11/1991 | WIPO . |

OTHER PUBLICATIONS

Parkash, "Residence Times of Crystals in a Fluidised Bed Crystallizer", *Chemistry and Industry*, pp. 919–920.

Parkash et al., "Crystal Growth in Fluidized Beds", *Indian Chemical Engineer*, Jan. 1968, pp. 3–6.

Vragov, "Investigation of Ammonium Sulfate Crystallization in a Pseudo Liquified Layer", *Sb. Nauch, Tr., Kuzbas, Politekh. Int.*, No. 26, 1990.

Postnikov et al., "Crystallization of Ammonium Sulfate in a Two–Circuit Device with a Circulating Suspension", *Koksii Khimiya*, No. 4, 1983, pp. 24–27.

GALORYL ATH 632 Product Bulletin, Lobeco Products Inc.

*Primary Examiner*—Wayne Langel
*Assistant Examiner*—Melanie Wong

[57] ABSTRACT

Solids having a tendency to cake are treated with distillation heavies that are liquid at about 60° C. or less and are obtained from production of a ketone having the formula:

R=O, wherein R is substituted or unsubstituted, branched, straight chain or cyclic, $C_4$ to $C_{18}$. The solids so treated have a reduced tendency to cake.

20 Claims, 2 Drawing Sheets

Cake Breaking Force Vs. Treatment Level

U.S. PATENT DOCUMENTS

| | | | |
|---|---|---|---|
| 2,795,487 | 6/1957 | Otto | 23/273 |
| 2,805,125 | 9/1957 | Van Ackeren | 23/119 |
| 2,874,028 | 2/1959 | Ponchaud | 23/119 |
| 2,895,800 | 7/1959 | Otto | 23/119 |
| 3,186,828 | 6/1965 | Baarson et al. | 71/64.12 |
| 3,393,973 | 7/1968 | Almy | 23/89 |
| 3,598,563 | 8/1971 | Burch | 71/64.11 |
| 3,600,818 | 8/1971 | Lang | 34/10 |
| 3,794,099 | 2/1974 | Ganiaris | 159/48 R |
| 4,057,396 | 11/1977 | Matovich | 23/252 R |
| 4,141,316 | 2/1979 | Grun | 118/303 |
| 4,242,307 | 12/1980 | Fally | 117/204 |
| 4,277,253 | 7/1981 | Walter et al. | 23/313 R |
| 4,332,933 | 6/1982 | DiDrusco et al. | 422/139 |
| 4,435,341 | 3/1984 | Bechtold | 264/7 |
| 4,536,418 | 8/1985 | Goldsmith | 427/213 |
| 4,698,913 | 10/1987 | Voll | 34/10 |
| 4,715,555 | 12/1987 | Newman et al. | 423/268 |
| 4,741,807 | 5/1988 | Wilhelm et al. | 196/14.52 |
| 4,859,315 | 8/1989 | Bartholic | 208/153 |
| 5,032,143 | 7/1991 | Ritakallio | 23/313 |
| 5,041,153 | 8/1991 | Detroit | 71/25 |
| 5,075,138 | 12/1991 | Tanaka et al. | 427/213 |
| 5,120,345 | 6/1992 | Kayaert et al. | 71/30 |
| 5,330,544 | 7/1994 | Thomson et al. | 23/313 |
| 5,366,512 | 11/1994 | Mischke et al. | 8/524 |
| 5,408,953 | 4/1995 | Thomson et al. | 117/206 |
| 5,431,708 | 7/1995 | Lehmann et al. | 71/64.12 |
| 5,454,851 | 10/1995 | Ziotnikov et al. | 71/64.07 |
| 5,531,843 | 7/1996 | Stromquist et al. | 149/46 |

ANTI-CAKING SOLIDS

FIELD OF THE INVENTION

The present invention relates generally to the solids handling industry with particular application to solid fertilizers that are provided with a reduced tendency to cake.

BACKGROUND OF THE INVENTION

Certain solids have a tendency to cake during storage and shipment. This problem is exemplified in the crop fertilizer field. Solid fertilizer materials are generally free-flowing granules that may be shipped in railcars or stored in large sheds. However, such materials can form firm cakes that can be broken only by severe impact. When caking occurs, the lumps or rocks that form cannot be easily handled by fertilizer spreading equipment. Fertilizer consumers often require a relatively uniformly sized material. A wide range of particle size forms when caked fertilizer is broken-up, effecting product quality.

Caking in rail cars may result in the formation of a layer (possibly several inches thick) of the fertilizer against the rail car walls requiring additional labor and longer unloading times to empty the railcars. Also, caking in storage piles results in longer loading times. Additional labor and special equipment may be needed to break-up the stored pile.

Ammonium sulfate is an excellent example of a fertilizer that tends to cake on sitting or during shipment. While not wishing to be bound by any theory, one hypothesis involving the tendency of ammonium sulfate (and other water soluble fertilizers) to cake involves the daily temperature/humidity cycle. During the evening as the temperature cools, moisture from the atmosphere or "dew" condenses. The ammonium sulfate in contact with condensed moisture is partially dissolved and forms "bridges" between ammonium sulfate particles. During the day, the condensed moisture is evaporated by the heat from the sun. The "bridges" are dried and harden. Additionally, the problem is aggravated because ammonium sulfate and other bulk fertilizers are generally stored and shipped in containers which are not air-tight. Finally, if the ammonium sulfate is not completely dried by the production process, the residual moisture contributes to the caking problem in the same way as condensed "dew".

The manufacture of ammonium sulfate is the subject of a large body of patent literature. For example, processes for making ammonium sulfate are described in U.S. Pat. No. 2,226,101 to Ogden. Ogden describes the addition of creosote or other oily substances to the mother liquor to carry impurities in the crystals to the surface of the liquor for removal, thus improving the whiteness of the crystals.

Ammonium sulfate is known to cake on standing in bulk. Methods proposed to overcome this tendency include crystal size and morphology control. Exemplary such methods are described in U.S. Pat. No. 1,919,707 to Gordon et al., U.S. Pat. No. 2,228,742 to Applebey and U.S. Pat. No. 5,330,544 to Thomson et al.

Sprays have been applied to ammonium sulfate crystals obtained from the dry distillation of coal to deodorize them. For example, Japanese Kokai 62(1987)-46920 describes spraying such crystals with a pH 7–8, ammonium-rich saturated ammonium sulfate solution.

Ammonium sulfate has also been granulated to improve particle size distribution. U.S. Pat. No. 4,277,253 to Walter et al. describes the granulation of ammonium sulfate and other fertilizer ingredients.

It is known to apply organic materials to such fertilizer granules to inhibit the tendency of the materials to cake. U.S. Pat. No. 4,717,555 to Newman et al. describes naphthalene sulfonates and water applied to ammonium salts to prevent caking and dust formation. U.S. Pat. No. 5,041,153 to Detroit describes lignosulfonate treated inorganic fertilizer chemicals that resist caking and dust formation.

Russian Inventor's Certificate 2019535 C1 describes the use of glycerol residuum (bottoms formed in the distillation of crude glycerol) applied to potassium chloride as an anti-dusting agent.

Lobeco Products Inc. offers an anti-caking product under the name Galoryl™ ATH 632. Galoryl ATH 632 is a solid at ambient temperature and must be heated (to about 80° C.) to the liquid state before application. This adds to the handling difficulty and contributes to the safety precautions that must be in place to prevent burns from spillage of heated liquids. In addition to presenting handling difficulties, sprays such as Galoryl are expensive and add significantly to the production cost of free-flowing granules. Therefore, a need remains for safely and economically producing granules that are free-flowing even after storage and shipment.

SUMMARY OF THE INVENTION

Accordingly, it is an object of the present invention to provide granules like ammonium sulfate that are free-flowing even after storage and shipment.

It is a further object of the present invention to provide a process for making a storage stable free flowing granules.

These and related objects and advantages are met in an at least partially water soluble solid treated with distillation heavies obtained from the production of a ketone having the formula:

$$R=O,$$

wherein R is substituted or unsubstituted branched, straight chain or cyclic $C_4$ to $C_{18}$. The distillation heavies will be liquid at about 60° C. or less. The preferred distillation heavies are distillation heavies from the production of cyclohexanone. The solid may be selected from the group of ammonium sulfate; ammonium nitrate; sodium nitrate; potassium nitrate; calcium nitrate; urea; diammonium phosphate; ammonium polyphosphate; monoammonium phosphate; triple superphosphate; ammonium chloride; potash; potassium chloride; potassium nitrate; potassium chloride; and mixtures of these. Other solids treated with the specified distillation heavies also fall within the scope of the invention. However, the presently preferred solid is ammonium sulfate granules or a mixture thereof. For use in fertilizer applications, the distillation heavies are preferably present at the rate of about 0.1 to about 20 lb./ton solid and, more preferably, at about 2 to about 6 lb./ton solids.

The invention also includes a process for hindering the tendency of solids to cake comprising by treating the solids with certain distillation heavies as described above. The distillation heavies are liquid at about 60° C. or less and are obtained from production of a ketone having the formula:

$$R=O,$$

wherein R is substituted or unsubstituted, branched, straight chain or cyclic, $C_4$ to $C_{18}$.

Related objects and advantages will become apparent to those of ordinary skill in the art to which the invention pertains after reading the following detailed description of the invention.

DETAILED DESCRIPTION OF THE PREFERRED EMBODIMENTS

Figure 1:
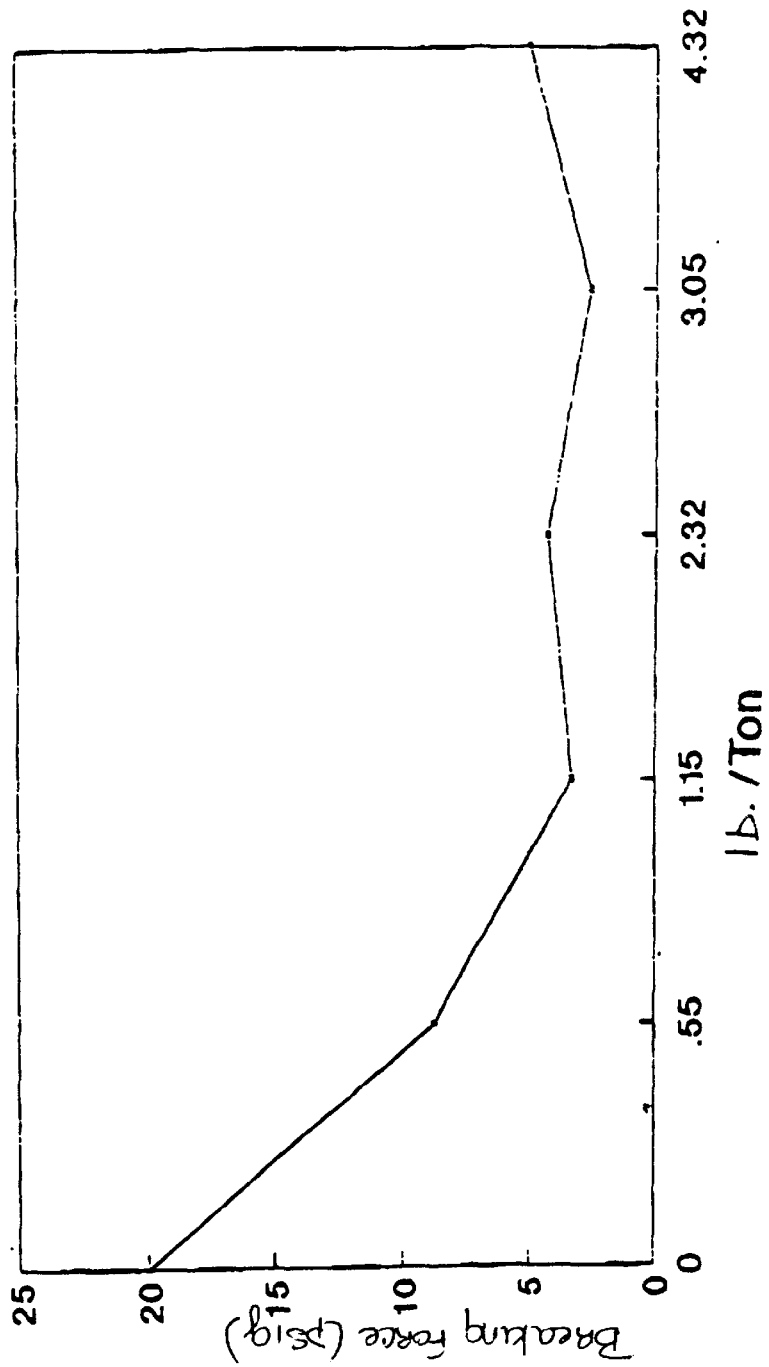
FIG. 1 is a graph showing the decrease in force necessary to break an ammonium sulfate cake treated according to the present invention.

The invention will now be described with reference to the Figures and specific language will be used to describe the same. No limitation should be inferred due to the specific language. Modifications, further embodiments and equivalents as envisioned by the ordinarily skilled in this art, are considered within the scope of the present invention and its elements.

The solids handling industry uses different terms to describe solids. "Powder" generally defines a very fine or dust-like material. "Granules" refer to larger particles that have more mass. "Particulate" is another term that is used. Agriculturists want to apply granular materials because they spread uniformly. Lighter materials are more difficult to spread uniformly on fields, especially on windy days. During the solids handling process, however, breakage occurs and dust or fines are generated. It should be understood in reading the following detailed description of the present invention that the term "granules" is not used in any limiting sense and applies to granular materials as well as fines, powders, particulate, combinations of these, etc.

One aspect of the present invention is a process for hindering the tendency of solids to cake by applying, the distillation heavies from the production of a ketone having the formula:

$$R=O,$$

to the solid, wherein R is substituted or unsubstituted, branched, straight chain, or cyclic $C_4$ to $C_{18}$. Such distillation heavies are in the liquid state at 60° C. or less. It is surprising that this byproduct stream can be effectively used to prevent or significantly hinder the tendency of solids to cake on storage and shipment.

The useful distillation heavies are the by-product of the production of ketones according to the formula: $R=O$, wherein R is substituted or unsubstituted, cyclic, branched or straight chain $C_4$ to $C_{18}$. Preferably, the distillation heavies are the by-product of the production of cyclohexanone.

In some cases, the distillation heavies used in the present invention represent a cracked by-product stream. This means that a bottom stream from the production of a specified ketone is isolated and subjected to cracking conditions. Such conditions typically included elevated pressure and temperature. Exemplary temperatures are in the range of about 200° C. to about 400° C. and exemplary pressures are in the range of about 1,000 psig to about 3,000 psig. This cracking step will generate additional ketone which is distilled. The bottoms remaining after the distillation may be used in the present invention. It will be understood that this cracking step is optional.

While not wishing to be limited to the exact proportions of materials present in such distillation heavies, the following are exemplary components of cyclohexanone distillation heavies (in percent by weight by gas chromatography): cyclohexanone (0.4–1), cyclohexenyl cyclohexanone (6.3–10.4), cyclohexanone dimer (2–2.5), dicyclohexyl ether (4.7–8.3) cyclohexanol (0.2–0.8), diols (primarily $C_6$–$C_{12}$) (2.4–4.5), other ethers (primarily $C_6$–$C_{12}$) (1.1–2.5), other ketones (primarily $C_6$–$C_{12}$) (2–2.7) and nonvolatile condensation products of cyclohexanone and cyclohexanol (65–82). Cyclohexanone distillation heavies are an opaque dark brown liquid that freeze at about −35° C.

The present invention is applicable to a variety of granules that tend to cake, including any solid material that dissolves in water to significant degree. Such materials are found in many industries such as food, cosmetic, mining, sodium chloride, etc., industries. The reference to the fertilizer industry and fertilizer granules in this detailed description is, therefore, not considered to limit the present invention to the fertilizer industry. Exemplary granules include ammonium sulfate, ammonium nitrate, sodium nitrate, potassium nitrate, calcium nitrate, urea, diammonium phosphate, ammonium polyphosphate, monoammonium phosphate, triple superphosphate, urea, ammonium chloride, potash, potassium chloride, potassium nitrate, potassium chloride and mixtures of these with other granules and with each other. Preferably, the granules are fertilizer granules and most preferably ammonium sulfate and mixtures thereof.

The distillation heavies may be applied by spraying directly on the granules or by other methods of application. Spraying is the currently preferred method. Spraying may be accomplished, for example, by pumping the anti-caking agent through a spray nozzle which directs the anti-caking agent on to the material to be treated. Various methods of pumping (i.e., types of pumps, use of a vapor pad to move the anti-caking liquid, etc.) can be used as well as various types of nozzles (distributors, mixing drums, etc.). Many types of conventional and novel equipment can be used for this application. The anti-caking agent should be applied in a uniform layer on the material to be treated. In some cases, the distillation heavies may be heated before application but this is not essential. When heating is desired, the preferred heating temperature is from about 20° to about 60° C.

The rate of application will depend on the end use for which the solids are intended. In the case of fertilizers, the application rate is preferably in the range of about 0.1 pound to about 20 pounds per ton of granules. More preferably, the application rate is about 2 to about 6 pounds of distillation heavies per ton of granules.

Another aspect of the present invention is a substantially non-caking solid treated with the distillation bottoms from the production of a ketone having the formula:

$$R=O,$$

wherein R is substituted or unsubstituted, branched, straight chain or cyclic $C_4$ to $C_{18}$. Such distillation heavies are in the liquid state at about 60° C. or less. The useful distillation heavies are described in more detail above in connection with the process aspect of the present invention. The preferred heavies are from the production of cyclohexanone as described previously.

The treated solid of the present invention may be any one of a variety of granules that tend to cake, including any material that dissolves in water to significant degree. Such materials are found in many industries such as food, cosmetic, mining, sodium chloride, etc., industries. As noted in connection with the process of the present invention, the reference to the fertilizer industry and fertilizer granules in this detailed description is not considered to limit the present invention to the fertilizer industry. Exemplary granules include ammonium sulfate, ammonium nitrate, sodium nitrate, potassium nitrate, calcium nitrate, urea, diammonium phosphate, ammonium polyphosphate, monoammonium phosphate, triple superphosphate, urea, ammonium chloride, potash, potassium chloride, potassium nitrate, potassium chloride and mixtures of these with other granules and with each other. Preferably, the solid granules are fertilizer granules and most preferably ammonium sulfate and mixtures thereof.

To make the treated solid of the present invention, the distillation heavies may be applied by spraying directly on the granules as described above in connection with the process. The rate of application is in the range of about 0.1 to about 20 pounds per ton of the solids to be treated. Preferably, the application is at a rate of about 2–6 lb. distillation heavies for ton of the solid to be treated.

The invention will now be described in the following specific examples, however, no limitation on the scope of the invention should be inferred from the specific details of these examples.

EXAMPLE 1

Untreated Ammonium Sulfate

Untreated ammonium sulfate powder is placed in a test cell and a pressure of 2 metric tons per square inch is applied for 1 minute. The cake is removed from the test cell and is placed on a force gauge and broken. This procedure is repeated on seven different samples from the same production lot. The data from these seven trials is averaged. The average force needed to break these cakes is 22.6 lb. per square inch.

EXAMPLE 2

Untreated Ammonium Sulfate

Ammonium sulfate from a second production lot is subjected to the procedure of Example 1 except that the procedure is repeated three times instead of seven. The average force needed to break these cakes is 20.0 lb. per square inch.

EXAMPLES 3–7

Invention

Ammonium sulfate from the same production lot as Example 1 is sprayed with cyclohexanone distillation bottoms using a plastic spray bottle. The spray bottle is weighed before and after spraying to determine how much cyclohexanone bottoms are applied. The spraying is accomplished by placing about 4000 g of untreated ammonium sulfate in a laboratory drum mixing apparatus. After spraying, the drum is mixed for several minutes. Samples from the drum mixing apparatus are used for cake breaking tests.

For Examples 3–7 the application rates are (in pounds per ton of ammonium sulfate) 0.55, 1.15, 2.32, 3.05 and 4.32 pounds, respectively. The treated ammonium sulfate is subjected to the procedure described in Example 1 except that the procedure is repeated 3 times (4 times for Example 5) for each application level, instead of seven. The average force (in pounds per square inch) needed to break the cakes of Examples 3–7 is 8.7, 3.3, 4.3, 2.6, and 5, respectively. The data is presented graphically in FIG. 1 with data from Example 1 as a comparison. The data is presented also in the Table.

EXAMPLES 8–10

Comparative Anti-Caking Agents

Figure 2:
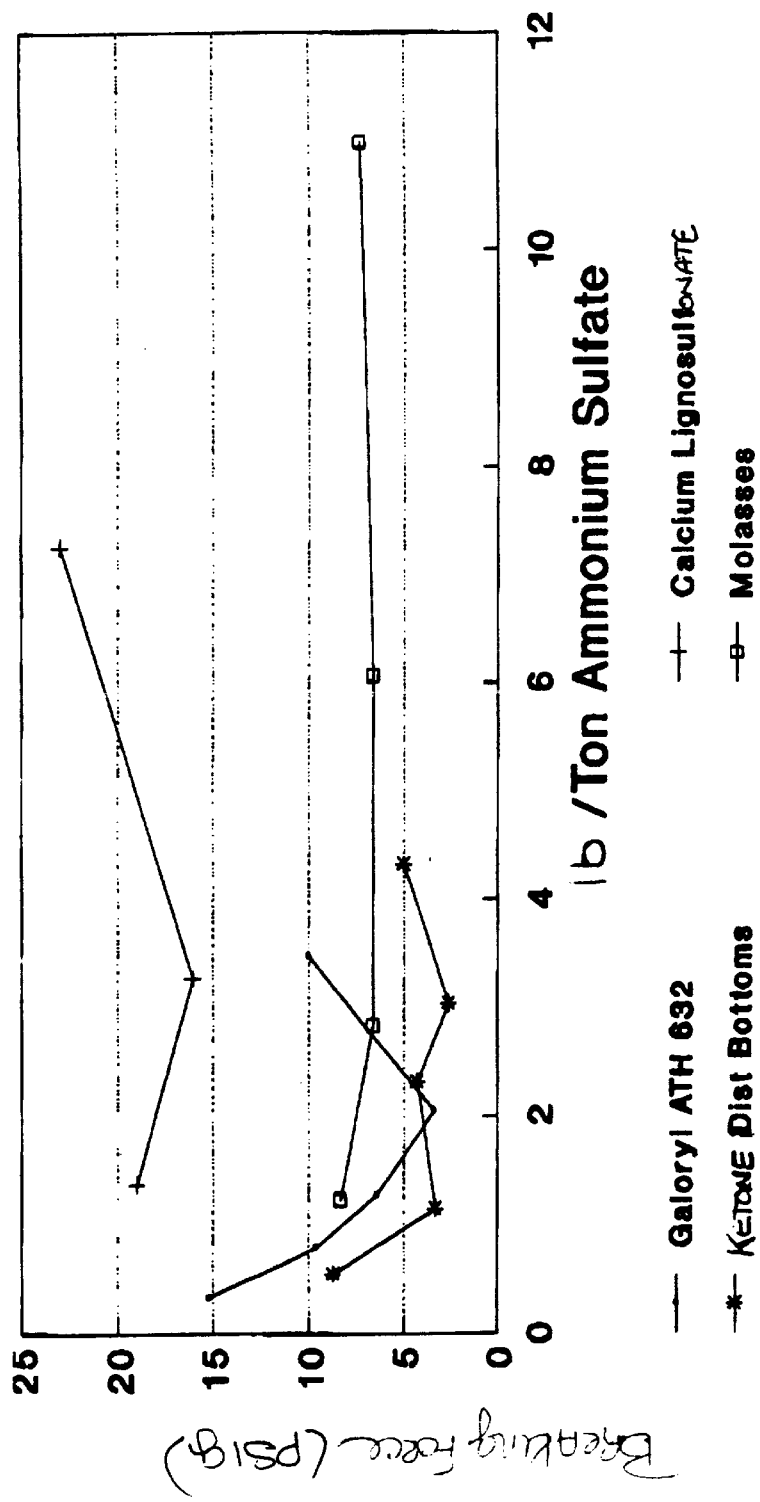
FIG. 2 is a graph comparing the anti-caking performance of the present invention with prior art anti-caking agents.

The procedure of Example 3 is followed using three prior art anti-caking agents for comparison. The agents and the conditions used for each Example are presented in the Table below. The agents are applied to ammonium sulfate cakes at the rates indicated and the breaking strength measured. The results are presented in tabular form below and graphically compared to the anti-caking agent of the invention in FIG. 2.

TABLE

| Example | Agent | Application Rate (lb./ton) | Breaking Force (lb.) |
|---|---|---|---|
| 3–7 | invention | 0.55 | 8.7 |
|  |  | 1.15 | 3.3 |
|  |  | 2.32 | 4.3 |
|  |  | 3.05 | 2.6 |
|  |  | 4.32 | 5 |
| 8 | molasses | 1.23 | 8.3 |
|  |  | 2.84 | 6.6 |
|  |  | 6.06 | 6.6 |
|  |  | 0 | 14.3 |
|  |  | 10.98 | 7.3 |
| 9 | Galoryl ATH 632 | 0.34 | 15.2 |
|  |  | 0.80 | 9.6 |
|  |  | 1.27 | 6.4 |
|  |  | 2.05 | 3.4 |
|  |  | 3.48 | 10. |
| 10 | calcium lignosulfonate | 1.37 | 19 |
|  |  | 3.28 | 16 |
|  |  | 7.25 | 23 |

What is claimed:

1. A process for hindering the tendency of solids to cake comprising the steps of:
    (a) treating the solids with distillation heavies, which heavies are liquid at about 60° C. or less and are obtained from production of a ketone having the formula:

R=O, wherein R is substituted or unsubstituted, branched, straight chain or cyclic, $C_4$ to $C_{18}$.

2. The process of claim 1 wherein said distillation heavies are distillation heavies from the production of cyclohexanone.

3. The process of claim 1 wherein said solids are selected from the group consisting of:
    ammonium sulfate;
    ammonium nitrate;
    sodium nitrate;
    potassium nitrate;
    calcium nitrate;
    urea;
    diammonium phosphate;
    ammonium polyphosphate;
    monoammonium phosphate;
    triple superphosphate;
    ammonium chloride;
    potash;
    potassium nitrate;
    potassium chloride; and
    mixtures of these.

4. The process of claim 3 wherein said solids are ammonium sulfate granules or a mixture thereof.

5. The process of claim 1 wherein said treating is by spraying said distillation heavies on the solids.

6. The process of claim 5 wherein said spraying is at a rate of from about 0.1 to about 20 lb. distillation heavies per ton solids.

7. The process of claim 6 wherein said spraying is at a rate of about 2 to about 6 lb. distillation heavies per ton solids.

8. The process of claim 1 further comprising heating said distillation heavies to from about 20° C. to about 60° C. before said treating.

9. The process of claim 2 wherein said solids are selected from the group consisting of:
ammonium sulfate;
ammonium nitrate;
sodium nitrate;
potassium nitrate;
calcium nitrate;
urea;
diammonium phosphate;
ammonium polyphosphate;
monoammonium phosphate;
triple superphosphate;
ammonium chloride;
potash;
potassium nitrate;
potassium chloride; and
mixtures of these.

10. The process of claim 9 wherein said solids are ammonium sulfate granules or a mixture thereof.

11. The process of claim 10 wherein said treating is at a rate of from about 0.1 to about 20 lb. distillation heavies per ton solids.

12. A substantially non-caking solid comprising:
an at least partially water soluble solid treated with distillation heavies, which heavies are liquid at about 60° C. or less and are obtained from production of a ketone having the formula:

$$R=O,$$

wherein R is substituted or unsubstituted branched, straight chain or cyclic $C_4$ to $C_{18}$.

13. The solid of claim 12 wherein said distillation heavies are distillation heavies from the production of cyclohexanone.

14. The solid of claim 12 wherein said solid is selected from the group consisting of:
ammonium sulfate;
ammonium nitrate;
sodium nitrate;
potassium nitrate;
calcium nitrate;
urea;
diammonium phosphate;
ammonium polyphosphate;
monoammonium phosphate;
triple superphosphate;
ammonium chloride;
potash;
potassium nitrate;
potassium chloride; and
mixtures of these.

15. The solid of claim 14 wherein said solid is ammonium sulfate granules or a mixture thereof.

16. The solid of claim 12 wherein said distillation heavies are present at the rate of about 0.1 to about 20 lb./ton solid.

17. The solid of claim 16 wherein said distillation heavies are present at about 2 to about 6 lb./ton solids.

18. The solid of claim 13 wherein said solid is selected from the group consisting of:
ammonium sulfate;
ammonium nitrate;
sodium nitrate;
potassium nitrate;
calcium nitrate;
urea;
diammonium phosphate;
ammonium polyphosphate;
monoammonium phosphate;
triple superphosphate;
ammonium chloride;
potash;
potassium nitrate;
potassium chloride; and
mixtures of these.

19. The solid of claim 18 wherein said solid is ammonium sulfate granules or a mixture thereof.

20. The solid of claim 19 wherein said distillation heavies are present at the rate of about 0.1 to about 20 lb./ton solid.

* * * * *